(12) United States Patent
Bell et al.

(10) Patent No.: US 6,856,601 B1
(45) Date of Patent: Feb. 15, 2005

(54) SHARED DIGITAL SIGNAL PROCESSING RESOURCES FOR COMMUNICATIONS DEVICES

(75) Inventors: Robert T. Bell, Bountiful, UT (US); Shmuel Shaffer, Palo Alto, CA (US); Robert E. Gleichauf, San Antonio, TX (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 857 days.

(21) Appl. No.: 09/825,667

(22) Filed: Apr. 3, 2001

(51) Int. Cl.[7] ................................................ H04L 12/64
(52) U.S. Cl. ...................................... 370/252; 370/356
(58) Field of Search ................................. 370/252, 352, 370/356

(56) References Cited

U.S. PATENT DOCUMENTS

| | | | | |
|---|---|---|---|---|
| 6,584,108 B1 | * | 6/2003 | Chung et al. ................ | 370/401 |
| 6,694,373 B1 | * | 2/2004 | Sastry et al. ................. | 709/238 |
| 6,785,339 B1 | * | 8/2004 | Tahernezhaadi et al. .... | 375/241 |

* cited by examiner

*Primary Examiner*—Melvin Marcelo
(74) *Attorney, Agent, or Firm*—Baker Botts L.L.P.

(57) ABSTRACT

A communications system provides packet-based communications between two or more remote devices. During the session, at least one of the devices may monitor quality parameters and request enhancement of the session based on those quality parameters. Responsive to the request, a DSP pool allocates DSP resources for the session and enhances packets for the communication session using the allocated DSP resources.

32 Claims, 4 Drawing Sheets

| SESSION ID | REQUESTING DEVICE | | REMOTE ENDPOINT | | SESSION PARAMETERS | | | RESOURCES ALLOCATED |
|---|---|---|---|---|---|---|---|---|
| | ADDRESS | CoS | ADDRESS(ES) | CoS | PACKET DELAY | PACKET LOSS | JITTER | |
| 654549 | 128.32.21.18 | GOLD | 128.15.24.12<br>128.14.11.09 | SILVER<br>BRONZE | 14ms | 12% | 24 | DSP243,<br>DSP244,<br>DSP245 |
| 946548 | 128.16.13.24 | SILVER | 128.13.12.12 | | 25ms | 16% | 35 | DSP132 |
| ... | ... | ... | ... | ... | ... | ... | ... | ... |

FIG. 4

FIG. 6 ic signal processing (DSP) resources for communications devices are provided which substantially eliminate or reduce disadvantages and problems associated with previous techniques. In a particular embodiment, the present invention satisfies a need for centralized DSP resources available to enhance communications for multiple communications devices. For example, one of the communications devices, upon detecting low quality communications or a degradation in quality, requests enhancement of a communication session. In response, selected resources from the central DSP resource pool are allocated to enhance the communication session.
SHARED DIGITAL SIGNAL PROCESSING RESOURCES FOR COMMUNICATIONS DEVICES

TECHNICAL FIELD OF THE INVENTION

The present invention relates generally to communications systems and, more particularly, to shared digital signal processing resources for communications devices.

BACKGROUND OF THE INVENTION

To reduce costs and facilitate convergence of data and voice systems, many users have switched to voice over packet (VoP) communications instead of or in addition to traditional telephone services. However, some VoP systems may introduce concerns over reliability and quality of voice communications. Digital signal processors (DSPs) in VoP devices may improve perceived voice quality, but use of DSPs can escalate costs by requiring the inclusion of expensive components. Moreover, in certain circumstances, distortions in received signals may prove too severe for the limited processing power of a DSP in a VoP device. In addition, the dedicated processors in a VoP device remain idle while the device is not in use and may provide limited quality enhancement for communications. Thus, adding DSPs to VoP devices can unnecessarily increase costs while providing benefits in limited circumstances.

SUMMARY OF THE INVENTION

In accordance with the present invention, techniques for providing shared digital signal processing (DSP) resources for communications devices are provided which substantially eliminate or reduce disadvantages and problems associated with previous techniques. In a particular embodiment, the present invention satisfies a need for centralized DSP resources available to enhance communications for multiple communications devices. For example, one of the communications devices, upon detecting low quality communications or a degradation in quality, requests enhancement of a communication session. In response, selected resources from the central DSP resource pool are allocated to enhance the communication session.

In accordance with one embodiment of the present invention, a communications system includes a communications devices participating in a packet-based communication session with a remote device. The communications device determines that a quality parameter for the communication session fails to meet a threshold and requests enhancement of the communication session. The system also includes a resource manager that receives the request from the communications device, allocates a digital signal processing (DSP) resource for the communication session, and routes the communication session through the DSP resource. The DSP resource then processes packets for the communications device to enhance the communication session.

In accordance with another embodiment of the present invention, a method for enhancing a packet-based communication session receives packets associated with a packet-based communication session from a remote device and presents contents of the packets to a user. The method determines that a quality parameter for the communication session fails to meet a threshold and, based on the determination, requests enhancement of the communication session from a remote resource manager. After requesting enhancement, the method receives enhanced packets from a DSP resource assigned by the resource manager responsive to the request, with the enhanced packets generated by the DSP resource by processing information in the packets communicated by the remote device.

Various embodiments of the present invention provide a number of technical advantages. Using these techniques, a system may provide shared DSP resources available to any number of communications devices. By providing shared resources, the system can increase overall usage of each DSP resource, thus decreasing idle time for potentially costly DSP resources. Therefore, the system can provide sufficient DSP resources for multiple communications devices while reducing the overall cost for these resources.

In addition, the system provides for measurement of voice related parameters at the endpoints of a communication session, thus providing relatively accurate measurements of voice quality as perceived by users. After measuring voice quality parameters, an endpoint may analyze the parameters and determine whether to request allocation of remote DSP resources. For example, a communications device detecting quality parameters that fail to meet a threshold automatically requests DSP resources from a central resource manager. Alternatively, endpoints may report quality parameters to a central location, which then analyzes the parameters to detect quality degradations necessitating DSP resource allocations.

Systems may include one or more resource managers responsible for allocating DSP resources located in various pools throughout a network. A resource manager may allocate DSP resources according to any suitable parameters and criteria. For example, a resource manager may allocate DSP resources based upon parameters received from requesting devices. These parameters may include the level of degradation suffered by the requesting device and/or the class of service of the requesting device. In certain circumstances, subscribers who pay for, or are assigned, a higher class of service may receive access to DSP resources before other subscribers. However, resource managers may use any suitable techniques and criteria for allocating DSP resources. Moreover, a resource manager may reallocate DSP resources among requesting subscribers according to changing conditions, such as changes in quality of various communication sessions.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
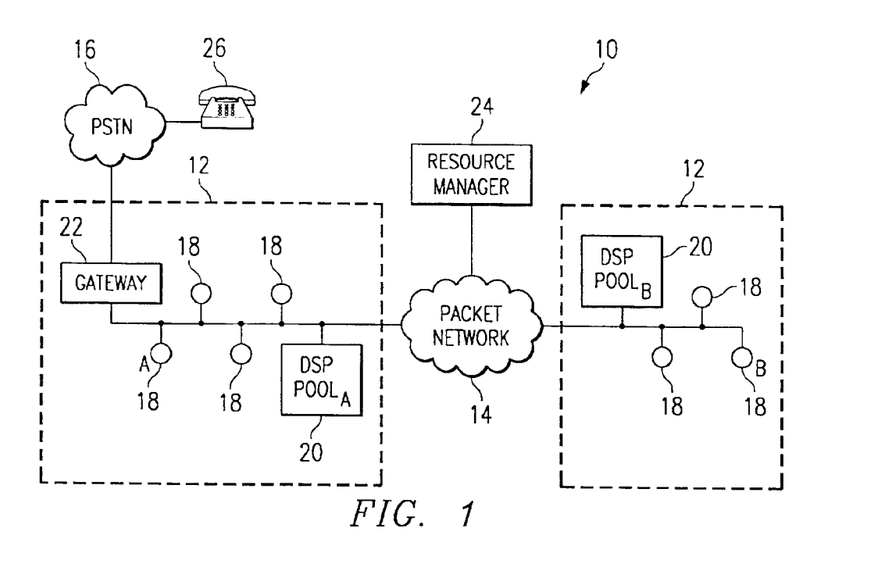
FIG. 1 illustrates a communications system having shared DSP resources according to the present invention.

FIG. 1 illustrates a communications system, indicated generally at 10, that includes local area networks (LANs) 12, packet network 14, and a public switched telephone network (PSTN) 16. LANs 12 support communications between packet-based communications devices 18 and couple to remote LANs 12 via packet network 14. LANs 12 include digital signal processing (DSP) resource pools 20, which include shared DSP resources for use by devices 18. Some or all LANs 12 also include gateways 22, which couple LANs 12 to other types of networks, such as PSTN 16. In general, system 10 supports packet-based communications between devices 18 and provides DSP pools 20 that include shared DSP resources for enhancing packet-based communication sessions. More specifically, particular devices 18 monitor quality of communication sessions and request enhancement of communication sessions upon detecting quality that fails to meet a threshold.

To facilitate management and control of DSP pools 20, system 10 includes a resource manager 24 to handle allocation of resources from DSP pools 20 for enhancement of communication sessions. Resource manager 24 receives requests to enhance communication sessions and, in response, allocates DSP resources to requesting devices 18. Resource manager 24 may use any suitable information and criteria in determining allocation of resources from DSP pools 20 to various communication sessions. Moreover, resource manager 24 may reallocate resources based upon changing conditions within system 10. For example, resource manager 24 may initially allocate resources to a poor quality communication session and then reallocate the resources if the quality improves such that the resources are no longer necessary for enhancing the quality of the session.

Moreover, while this example illustrates a single resource manger 24 operating remotely from LANs 12, system 10 contemplates any suitable centralization or distribution of the functionalities of resource manager 24. For example, each DSP pool 20 may implement the functionalities of resource manager 24 for its local DSP resources. Alternatively, each LAN 12 may include a separate resource manager 24 to manage one or more DSP pools 20. Therefore, system 10 contemplates any suitable degree of distribution of the functions of resource manager 24 among components and locations.

Communications between devices 18 may take place within a single LAN 12, between LANs 12, and/or between LANs 12 and other networks. Each LAN 12 represents a collection of components capable of communicating using packet-based communications protocols. For example, devices 18, DSP pool 20, and gateway 22 may couple to an Ethernet network and communicate using internet protocol (IP) communications. LANs 12 couple to each other using packet network 14. That is, packet network 14 supports packet-based communications between remotely located devices. Packet network 14 includes any suitable collection and arrangement of components, such as elements of PSTN 16, LANs 12, wide area networks, a global communications network such as the Internet, and/or other suitable wireless and wireline elements.

LANs 12 couple to other networks, such as PSTN 16, using gateways 22. Gateways 22 permit devices 18 to establish communication sessions with other networks and types of communications devices, such as time division multiplexed (TDM) device 26. For example, device 26 may represent a standard telephone coupled to PSTN 16, while device 18 supports a voice over packet (VoP) communication session with device 26 as a remote endpoint using gateway 22 as an intermediary element. Thus, as evidenced by this example, gateway 22 represents hardware and/or software supporting communications between devices implementing various communications protocols. Therefore, for this example, gateway 22 converts between packet-based communications of device 18 and TDM based communications for device 26. However, gateways 22 may support links between any suitable types of communications devices by converting between appropriate communications protocols.

In operation, devices 18 establish packet-based communication sessions with other elements, such as other devices 18 located within the same or within a remote LAN 12, with devices 26, or with other suitable elements. For example, device 18 labeled A (device A) establishes a voice over packet communication session with device 18 labeled B (device B). During this session, packets encoding voice information stream between device A and device B through LANs 12 and packet network 14. During the communication session, disturbances, interference, congestion, and other factors may degrade the quality of the communication session. For example, interference may cause packet delays, packet loss, and other conditions that reduce the quality of voice communications as perceived by the users of devices A and B. Therefore, devices A and/or B monitor quality parameters during the session and, upon detecting low quality communications, may request resource manager 24 to enhance the quality of the session.

Thus, during a communication session, each participating device 18 may monitor quality parameters for the session. These quality parameters include any suitable metrics for determining quality of the communications. Such metrics include packet delays, packet loss percentages, corruption of received packets, and any other suitable metric for determining quality. For example, device 18 may monitor the contents of a jitter buffer to determine whether a significant number of packets are being lost or delayed during transmission. Based on the values for these quality parameters, device 18 may determine that the quality of the communication session fails to meet some predetermined threshold. For example, if the packet loss percentage exceeds some predetermined threshold, device 18 may determine that quality has degraded such that voice information presented to a user may contain a perceptible quality degradation. However, to monitor quality of a communication session, device 18 uses any suitable criteria for considering one or more quality parameters. In addition, according to particular embodiments, device 18 initiates enhancement of a session in response to an indication from a user. For example, using an appropriate interface, such as a button, dual tone multi-frequency (DTMF) indication, or other suitable signal, a user indicates perceived quality degradation of a session.

When the quality of a communication session degrades, device 18 may request enhancement of the session. According to a particular embodiment, device 18, upon detecting poor quality, contacts resource manager 24 and requests enhancement of the communication session to increase quality perceived by a user. This request may include any suitable information for use by resource manger 24 in allocating DSP resources to enhance the communication session. For example, the request may include the quality parameters determined by device 18, which resource manager 24 then uses to determine the relative need of device 18 for resources. Resource manger 24 may compare the quality parameters received from device 18 to quality parameters received from other requesting devices 18 and allocate resources among the requesting devices 18 according to the different values for these quality parameters. Thus, in response to the request from device 18, resource manager 24 may allocate one or more DSP resources from DSP pools 20 or may deny the request. Moreover, resource manager 24 allocates resources among requesting devices 18 according to any suitable criteria, such as usage of DSP resources among devices 18 in system 10, class of service of devices 18 using and requesting resources, severity of disturbances, physical locations, and/or other suitable factors.

After determining appropriate DSP resources from DSP pools 20 to allocate for device 18, resource manager 24 reroutes the communication session such that packets for delivery to the requesting device 18 pass through the allocated resources in DSP pool 20. For example, if device A requests enhancement of the communication session with device B, resource manager 24 reroutes the communication session so that packets from device B pass through allocated DSP resources in DSP pool 20 before delivery to device A. To reroute these packets, resource manager 24 may instruct device A and device B to reroute the media stream through DSP pool 20, for DSP pool 20 to intercept the packets, for device 13 to begin transmitting packets for delivery to DSP pool 20, or using any other suitable technique.

The allocated DSP resources process rerouted packets to enhance the communication session of device A. Allocated DSP resources may perform any suitable processing of rerouted packets and information encoded in these packets to enhance quality. For example, the allocated DSP resources may process or filter information in the packets to reduce spurious signals such as echoes, static, and other undesirable interference. To enhance the session, the allocated DSP resources may perform processing to interpolate or extrapolate from received packets to account for packets lost in transmission through packet network 14. Alternatively or in addition, in response to congestion within packet network 14, DSP resources in DSP pools 20 on either side of packet network 14 may work in concert to increase the compression rate for packets in the communication session in an effort to reduce packet loss.

For example, DSP pool B receives packets generated by device B and increases the compression of information in these packets to reduce bandwidth requirements for packet network 14. DSP pool A receives these compressed packets and decompresses the packets for delivery to device A. This results in a net decrease in bandwidth usage of packet network 14 by the communication session, without requiring device A and device B to support a high rate of compression. However, while these examples illustrate specific methods for DSP resources to enhance packet-based communications, system 10 contemplates DSP resources using any suitable processing to enhance packet-based communication sessions for devices 18. Moreover, DSP resources may enhance any suitable packet-based communication sessions, such as unidirectional or bi-directional data, voice, video, audio, and/or other suitable packet-based communications.

As previously discussed, other elements of system 10 can operate in place of or in concert with resource manager 24 to determine an appropriate allocation of DSP resources for requesting devices 18. According to a particular embodiment, devices 18 communicate requests directly to an associated DSP pool 20, which, in response, allocates some of its local DSP resources to the requesting device 18. For example, device A, upon detecting a low quality communication session, communicates a request for resources to DSP pool A. DSP pool A then allocates some of its resources for enhancing the communication session. However, if DSP pool A determines that it has insufficient DSP resources to allocate for the communication session of device A, DSP pool A may forward the request from device A to another DSP pool 20 or otherwise direct device A to contact another DSP pool 20.

Furthermore, in allocating DSP resources, DSP pools 20 may communicate with each other. For example, to implement increased compression of a communication session over packet network 14, DSP pool A and DSP pool B may coordinate allocation of DSP resources sufficient to handle the increased compression of the communication session. Thus, various allocation functions may be distributed among any appropriate elements, and various components within system 10 may communicate to effect an appropriate allocation of DSP resources among requesting devices 18.

Figure 2:
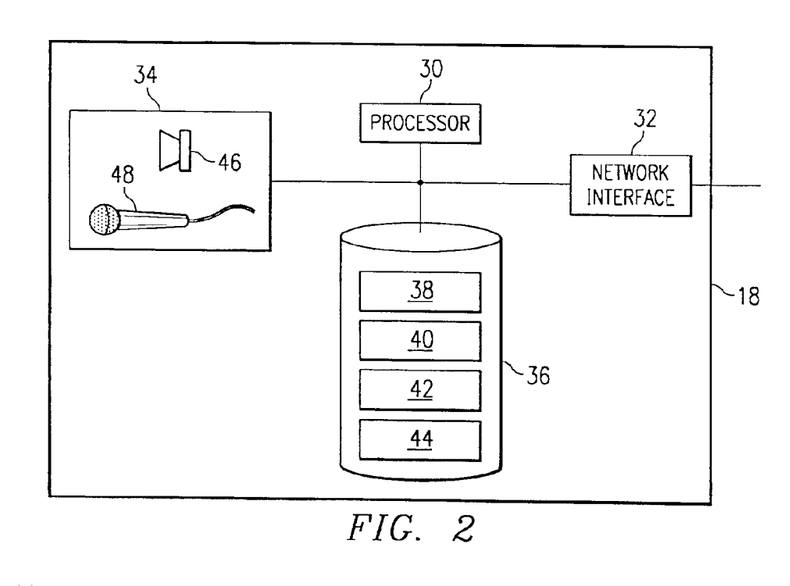
FIG. 2 is block diagram illustrating a communications device from the system that may request allocation of shared DSP resources.

FIG. 2 is a block diagram illustrating functional components of an exemplary device 18 that includes a processor 30, a network interface 32, a user interface 34, and a memory 36. Network interface 32 couples device 18 to other communications equipment, such as other devices 18, gateways 22, DSP pools 20. In general, device 18 establishes packet-based communication sessions with remote communications equipment using network interface 32, while processor 30 monitors the communications and determines whether to request enhancement of a communication session. More specifically, processor 30 may determine that quality parameters for a packet-based communication session have degraded and, in response, request allocation of DSP resources from DSP pool 20.

Memory 36 supports the operation of elements within device 18 by maintaining information in long or short term storage. Thus, memory 36 represents any collection and arrangement of volatile or non-volatile, local or remote devices suitable for storing data, for example, random access memory (RAM) devices, read only memory (ROM) devices, magnetic storage devices, optical storage devices, or any other suitable data storage devices. In the embodiment illustrated, memory 36 stores communications logic 38, session data 40, quality thresholds 42, and addressing information 44.

Communications logic 38 represents algorithms, software, code, and/or other appropriate logic modules for use by device 18. For example, logic 38 may include a program for execution by processor 30 to provide packet-based communication sessions with remote devices. Session data 40 includes information relating to a communication session established by device 18. For example, session data 40 may include addresses for other remote participants, a jitter buffer for accumulating received packets, quality parameters for the communication session, and other appropriate information. Quality thresholds 42 include information for use by device 18 in determining whether communications have degraded. For example, thresholds 42 may include values for comparison against current quality parameters maintained in session data 40. Addressing information 44 includes data used to contact remote equipment when requesting allocation of DSP resources. For example, address information 44 may include addresses for resource manager 22, DSP pools 20, and/or other suitable elements. However, while the embodiment illustrated indicates specific information stored by memory 36, system 10 contemplates device 18 maintaining any suitable information for providing communications services, monitoring quality of communications, and requesting allocation of remote DSP resources based on quality determinations.

For interactions with users, device 18 includes user interface 34, which has an output device 46 and an input device 48. Output device 46 represents an interface for communicating information to a live operator, such as speaker, a monitor, or other suitable output elements. Input device 48 represents an interface for receiving information from a live operator, such as a microphone, keyboard, mouse, and/or other suitable input elements.

In operation, device 18 supports packet-based communication sessions with remote devices. Using input device 48, device 18 receives information from a user for communication to other participants in a communication session. Processor 30 controls the receipt of this information from the user and coordinates the generation of packets encoding this information. For example, processor 30 may implement or include a coder/decoder (CODEC) for converting voice information into and from packets. Network interface 32 may then communicate the packets for receipt by other participants in the communication session. In addition, network interface 32 receives packets containing information from the other participants in the communication session. Processor 30 extracts this information from the packets, and device 18 communicates the extracted information to the user using output device 46. For example, during a voice communication session, device 18 receives voice information from a user using input device 48 and generates audio signals using output device 46 based on information received from remote participants.

During a communication session, device 18 monitors quality parameters for communications received from remote participants. For example, processor 30 may monitor parameters such as packet delay, packet loss, performance of a jitter buffer, and/or other suitable parameters. Based on these quality parameters, processor 30 can determine whether the quality for a communication session fails to meet some threshold. Upon determining that a communication session is suffering from poor quality, device 18 contacts resource manager 24 or a selected DSP pool 20 to request enhancement of the communication session. For example, upon determining that quality parameters for a session fail to meet quality thresholds 42, processor 30 accesses addressing information 44 to determine an address for resource manager 24. Device 18 then communicates a request for allocation of DSP resources to resource manager 24. In addition to requesting resources, this request may include information for use by resource manager 24 in determining appropriate allocations of DSP resources to devices 18. For example, the request may include quality parameters measured by device 18, class of service for device 18, class of service for other session participants, and/or other appropriate information. Also, this request may include address information for all participants of the communication session. This addressing information may permit resource manager 24 to appropriately allocate DSP resources from various DSP pools 20 and to redirect packets for the communication session through the allocated resources.

After requesting enhancement of a communication session, device 18 may continue to monitor quality parameters. Using this information, device 18 can determine whether to request additional DSP resources for the communication session. Moreover, device 18 may report the quality parameters to resource manager 24 while the communication session is being enhanced. This permits resource manager 24 to determine the effectiveness of the allocated DSP resources and to perform dynamic reallocation of DSP resources during communication sessions. For example, resource manager 24 may allocate additional DSP resources to a session experiencing severe quality degradation or may withdraw allocation of DSP resources in certain circumstances, such as upon detecting an improvement in quality, upon detecting a more appropriate allocation of those resources, or for other suitable reasons.

While this example includes specific functional elements for device 18, system 10 contemplates device 18 containing any collection and arrangement of suitable elements. Thus, while the embodiment illustrates particular elements, device 18 may include other elements providing various functions for supporting packet-based communication sessions. In addition, system 10 contemplates implementing each of the functional elements within device 18 using any appropriate combination and arrangement of hardware and/or software and implementing any of the functionalities using logic encoded in a storage medium, such as a computer program maintained in a computer readable data storage medium.

Figure 3:
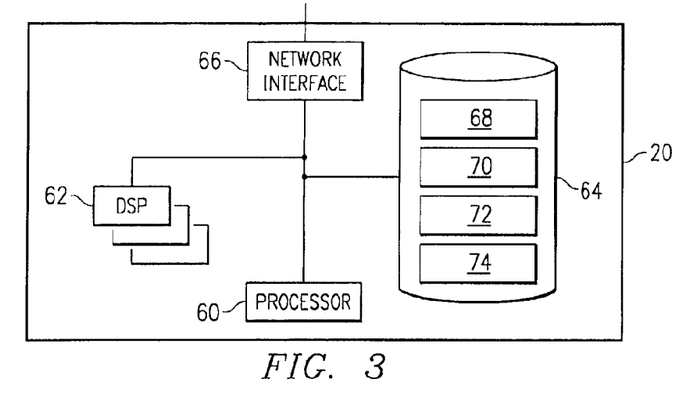
FIG. 3 is a block diagram illustrating a resource manager managing the allocation of DSP resources to communications devices.

FIG. 3 illustrates functional elements of an exemplary DSP pool 20. The embodiment illustrated includes a processor 60, DSP resources 62, a memory 64 and a network interface 66. Network interface 66 supports packet-based communications protocols and couples DSP pool 20 to remote communications equipment. Processor 60 operates to manage and control various elements of DSP pool 20 to allow DSP resources 62 to enhance packet-based communications for remote devices. In general, DSP pool 20 uses DSP resources 62 to enhance packet-based communication sessions between two or more remote devices.

To facilitate the operation of DSP pool 20, memory 64 may store any appropriate information. According to this embodiment, memory 64 includes allocation information 68, session information 70, allocation logic 72, and communications logic 74. Allocation information 68 details the availability of DSP resources 62 and may include data such as DSP resources 62 currently allocated, including specific devices 18 having current allocations. Session information 70 includes entries describing communication sessions that have received an allocation of DSP resources 62. For example, session information 70 may include, for each session, addresses for participants in the communication session, quality parameters for the communication session, and specific DSP resources 62 allocated for the session.

Allocation logic 72 represents software, code, or other suitable logic for use by processor 60 in controlling allocation of DSP resources 62. According to a particular embodiment, DSP pool 20 implements some or all of the functions of resource manager 24. Thus, allocation logic 72 may permit DSP pool 20 to receive and respond to requests from devices 18 for the allocation of DSP resources 62. To support allocation of DSP resources 62, allocation logic 72 may include data such as information on subscribers (for example, class of service information for subscribers) and network topology information indicating physical layout of network components and addresses for other DSP pools 20. Communications logic 74 represents algorithms, software, code, and/or other appropriate logic modules for use by DSP pool 20 in establishing communications with remote devices. For example, logic 38 may include a program for execution by processor 60 to provide packet-based communication sessions with devices 18. As with memory 36, memory 64 represents any suitable volatile or non-volatile, local or remote data storage devices. Moreover, while memory 64 shown in this embodiment stores specific types of information, system 10 contemplates DSP pool 20 storing any suitable information for use in allocating DSP resources 62 to enhance communication sessions and for use in enhancing sessions.

DSP resources 62 represent any suitable hardware, firmware and/or logic that operates to enhance information encoded in packets. For example, specific resources 62 may provide echo cancellation, interpolation or extrapolation of lost packets, compression and/or decompression of information in packets, suppression of spurious signals, and/or other processing for enhancement of packet-based communication sessions. Moreover, specific DSP resources 62 may operate to counter specific problems experienced during a communication session. Thus, a specific resource 62 may provide echo cancellation for communication sessions experiencing this problem. Therefore, allocation logic 72 may permit DSP pool 20 to diagnose specific types of problems based on quality parameters and to allocate appropriate types of DSP resources 62. Thus, according to a particular embodiment, DSP pool 20 includes specialized DSP resources 62 for handling various problems experienced by devices 18. Including such specialized DSP resources in devices 18 would dramatically increase component costs, yet DSP pool 20 provides a cost-effective technique that allows multiple devices 18 access to any number and type of DSP resources 62. In addition, according to particular embodiments, system 10 allocates DSP resources 62 only to communication sessions experiencing quality degradations or other conditions that can be addressed through processing. This permits a relatively small number of DSP resources 62 to enhance communications for multiple devices 18, since a majority of devices 18 will typically remain idle or not request allocations of resources 62 during communications.

In operation, DSP pool 20 uses DSP resources 62 to enhance one or more packet-based communication sessions, with each session established between two or more remote devices. DSP pool 20 allocates specific DSP resources 62 to a communication session based on commands received from resource manager 24 and/or based on requests received directly from devices 18. While enhancing a communication session, DSP pool 20 receives packets from one or more of the participants in the session and processes these packets using allocated DSP resources 62.

While enhancing a session, DSP pool 20 may determine quality parameters for the session and/or may receive quality parameters determined by participants in the communication session. Using these quality parameters, DSP pool 20 may dynamically modify allocation of DSP resources 62 between various communication sessions. Moreover, DSP pool 20 may compare measured quality parameters with quality parameters received from device 18 receiving enhancement to determine the effectiveness of the allocated DSP resources 62 and, if necessary, to respond to detected conditions. For example, to counter a degradation in quality that affects packets between DSP pool 20 and the receiving device 18, DSP pool 20 may determine another DSP pool 20 having a closer physical proximity in the network to device 18. However, system 10 contemplates DSP pools 20 and/or resource manager 24 monitoring any suitable information and applying any appropriate criteria for statically or dynamically allocating DSP resources 62 for the enhancement of packet-based communication sessions of devices 18 or other appropriate elements.

In addition, while the embodiment illustrated includes specific functional elements, system 10 contemplates DSP pool 20 including any appropriate combination and arrangement of components providing digital signal processing for packet-based communication sessions of devices 18. Moreover, system 10 contemplates implementing the functionalities of DSP pool 20 using any suitable distribution or separation of functionalities and components among devices at one or more locations. For example, as previously discussed, resource manager 24 may implement some or all of the functionalities of DSP pools 20. In addition, system 10 contemplates implementing each of the functional elements within DSP pool 20 using any suitable combination and arrangement of hardware and/or software and implementing any of the functionalities using logic encoded on a storage medium.

Figure 4:
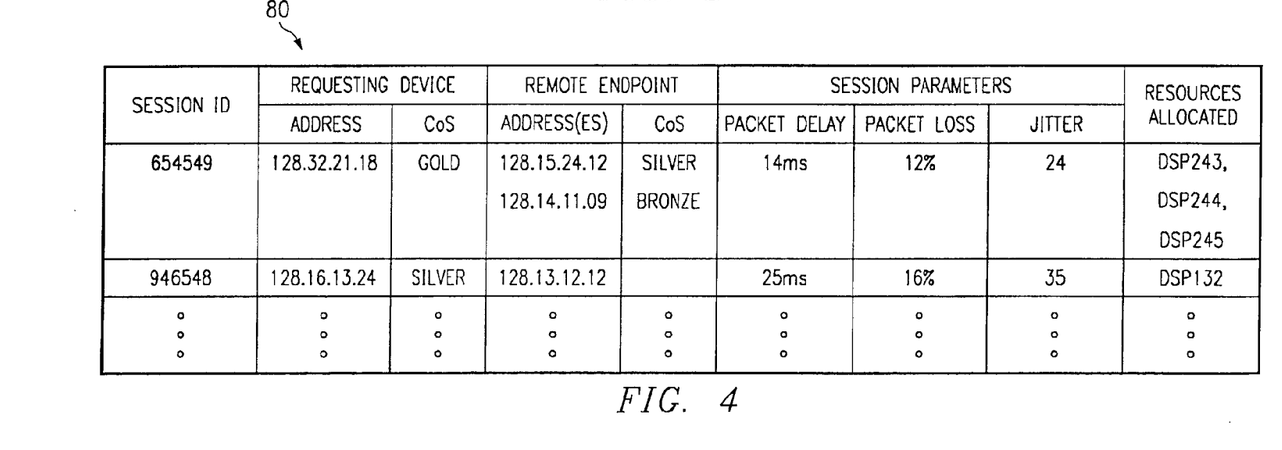
FIG. 4 is a table illustrating allocation information maintained by the resource manager.

FIG. 4 illustrates a table, indicated generally at 80, maintaining session information 70. In the embodiment illustrated, session information 70 includes a session identifier (ID), information on the participants in the communication session, quality parameters for the session, and DSP resources 62 allocated for the session. In general, DSP pool 20 and/or resource manager 24 may use information maintained in table 80 to manage allocation of DSP resources 62.

Within table 80, each session having allocated DSP resources 62 includes information on the participants in the session. This information includes address information and class of service (COS) information for device 18 that requested allocation of DSP resources 62. Moreover, table 80 includes address information and class of service data for the remote endpoints of the communication session. These endpoints represent participants in a communication session other than the requesting device 18. According to particular embodiments, DSP pool 20 uses the class of service data for multiple participants in a communication session to determine a class of service for the session. For example, DSP pool 20 may use the highest class of service of any participant, an average class of service for all participants, or any other suitable one or combination values for the participants.

During the communication session, DSP pool 20 receives packets communicated from one or more remote endpoints, processes these packets using allocated DSP resources 62 to enhance information encoded in these packets, and then communicates the enhanced packets to the address of requesting device 18. In addition, DSP pool 20 may monitor quality parameters for the packets received from each remote endpoint and maintain these quality parameters within table 80. In this example, table 80 includes, for each session, session parameters indicating packet delay, packet loss, and performance of a jitter buffer. While table 80 illustrates specific session information 70 maintained by DSP pool 20 and/or resource manager 24, system 10 contemplates maintaining any suitable information for managing the allocation of DSP resources 62 and maintaining this information using any appropriate data storage techniques.

Figure 5:
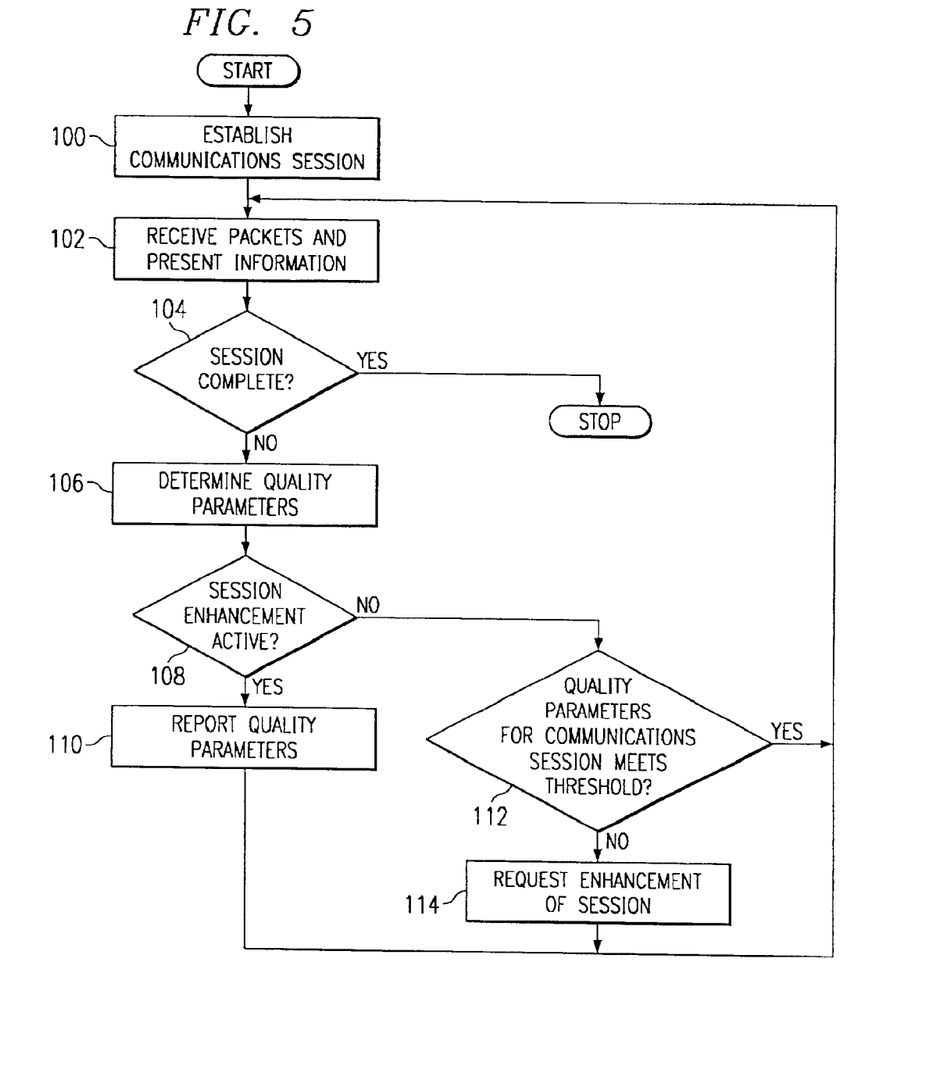
FIG. 5 is a flowchart illustrating a method for monitoring a communication session and requesting enhancement of the session when quality parameters fail to meet a threshold.

FIG. 5 is a flowchart illustrating a method for monitoring quality parameters for a communication session and requesting enhancement of the session if those quality parameters fail to meet a threshold. The following description focuses on the operation of device 18 in performing these functions. Device 18 establishes a packet-based communication session at step 100. During the session, device 18 receives packets and presents the information from these packets using output device 46 at step 102. If the session is complete at step 104, processing for that session is complete. However, while the session is active, device 18 determines quality parameters at step 106. Device 18 determines whether session enhancement is active at step 108. This determines whether device 18 has requested and received allocation of DSP resources 62. If so, device 18 may report quality parameters to resource manager 24 and/or DSP pool 20 and step 110. This permits the measurement of differences between quality parameters measured by device 18 and quality parameters measured by DSP pool 20.

If device 18 determines that session enhancement is not active, device 18 determines whether quality parameters for the communication session meet some threshold at step 112. For example, device 18 may compare the measured quality parameters to quality thresholds 42 stored in memory 36. If the quality parameters meet the threshold, device 18 continues receiving packets for the session and presenting information from these packets to the user at step 102. However, if the quality parameters fail to meet the threshold, device 18 may request enhancement of the communication session at step 114. For example, device 18 may generate a request including the measured quality parameters or other suitable information and communicate this request to resource manager 24 and/or DSP pool 20. After requesting enhancement of the session, device 18 continues receiving and presenting packets for the session at step 102. However, upon receiving an allocation of DSP resources 62, device 18 may receive enhanced packets at step 102, with these enhanced packets containing information processed by the allocated DSP resources 62.

Figure 6:
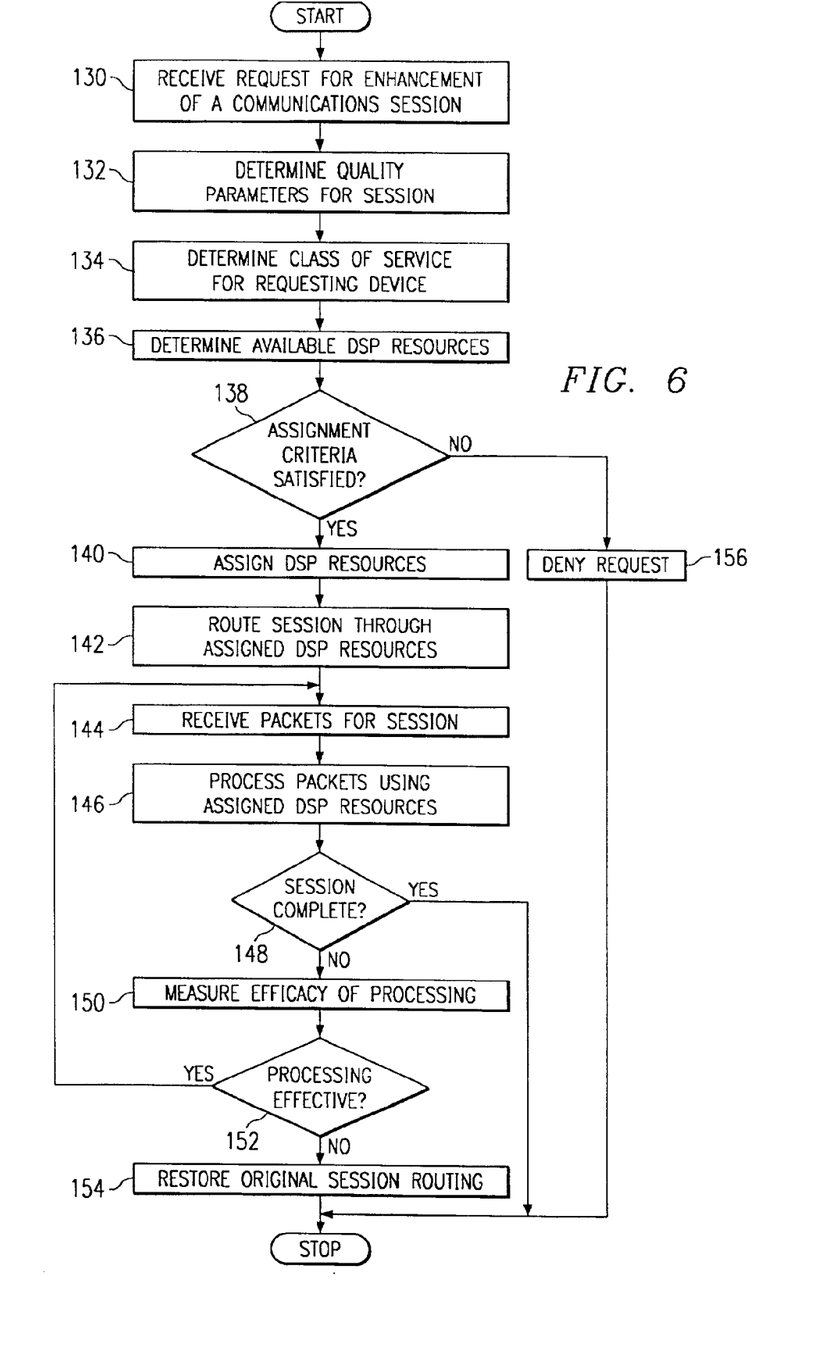
FIG. 6 is a flowchart illustrating a method for allocating DSP resources among requesting devices.

FIG. 6 is a flowchart illustrating a method for processing requests for enhancement of communication sessions and allocating DSP resources 62 based on these requests. While the following discussion of this flowchart illustrates the operation of DSP pool 20 in receiving requests and processing these requests, system 10 contemplates any suitable distribution or separation of these functions, for example, between resource manager 24 and DSP pools 20.

DSP pool 20 receives a request for enhancement of a communication session from device 18 at step 130. DSP pool 20 determines quality parameters for the session at step 132. For example, DSP pool 20 may receive measured quality parameters from device 18 as a portion of the request or may independently determine quality parameters for this session, for example, by monitoring packets. DSP pool 20 also determines a class of service for the communication session at step 134 and available DSP resources 62 at step 136. To determine class of service for the session, DSP pool 20 accesses information, such as information maintained by table 80, to determine class of service for one or more participants in the session. Thus, DSP pool 20 may use a class of service for the requesting device 18 and/or for other participants in the session, and may combine these various values in any suitable manner to establish a class of service for the communication session.

Using various parameters, such as the class of service, available DSP resources 62, measured quality parameters, protocols in use, network bandwidth, topology, and/or other suitable information, DSP pool 20 determines whether assignment criteria are satisfied at step 138. This determines whether or not to allocate DSP resources 62 for the communication session of the requesting device 18. However, as previously discussed, DSP pool 20 may use any suitable parameters and criteria in making this determination. If the assignment criteria are not satisfied, DSP pool 20 denies the request at step 156 and may communicate this denial to the requesting device 18.

However, if the assignment criteria are satisfied, DSP pool 20 assigns DSP resources 62 for the session at step 140 and routes the session through the assigned DSP resources 62 at step 142. As previously discussed, DSP pool 20 may use any suitable techniques for routing packets through the assigned DSP resources 62. For example, DSP pool 20 may contact and command any suitable communications equipment in LANs 12 or packet network 14 to effect a redirection of packets to the assigned DSP resources 62. Thus, DSP pool 20 begins receiving packets for the communication session at step 144 and processes these packets using assigned DSP resources 62 at step 146 to enhance quality of the packets received by the requesting device 18.

If the session is complete at step 148, DSP pool 20 completes processing of this request. However, while the session is active, DSP pool 20 may monitor the effectiveness of the processing performed by the allocated resources to determine whether or not to continue using resources for the session. Thus, DSP pool 20 measures efficacy of the processing at step 150. For example, DSP pool 20 may determine whether processing performed by assigned DSP resources 62 has a significant effect on the packets of the session. Alternatively, DSP pool 20 may determine whether packets received for processing are of sufficient quality to indicate that disturbances have abated or are potentially between DSP pool 20 and the requesting device 18. However, system 10 contemplates DSP pool 20 using any appropriate techniques for determining efficacy of the processing. If the processing remains effective at step 152, DSP pool 20 continues receiving packets for the session at step 144 and processing those packets using assigned DSP resources 62 at step 146.

However, if DSP pool 20 determines that the processing for the session is not effective, DSP pool 20 may restore original session routing at step 154 and discontinue processing of packets for the session using DSP resources 62. This may free previously allocated resources for use in enhancing other communication sessions. Moreover, while not illustrated in this flowchart, DSP pool 20 may perform other suitable dynamic reallocations of DSP resources 62 based on measured quality parameters, requests from other devices 18, overall usage of DSP resources 62, and/or other suitable criteria.

In addition, while this flowchart illustrates an exemplary method of operation, system 10 contemplates DSP pool 20 using any suitable techniques for responding to requests from devices 18 for enhancement of a communication session. Thus, many of the steps in this flowchart may take place simultaneously and/or in different orders than as shown. In addition, system 10 contemplates any suitable distribution or separation of resource management and processing functions between various elements, such as between resource manager 24 and DSP pools 20. Also, system 10 contemplates resource manager 24 and/or DSP pools 20 using methods with additional steps, fewer steps, and/or different steps, so long as the methods remain appropriate for responding to requests from devices 18 for enhancement of communication sessions. Thus, the example provided by this flowchart is merely illustrative, and system 10 contemplates using any suitable steps for elements in system 10 to allocate DSP resources for the enhancement of communication sessions between two or more remote devices.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communications system comprising:
   a communications device participating in a packet-based communication session with a remote device, the communications device operable to determine that a quality parameter for the communication session fails to meet a threshold and to request enhancement of the communication session from a remote resource manager responsive to the determination; and the resource manager operable to receive the request from the communications device, to allocate a digital signal processing (DSP) resource for the communication session, and to route the communication session through the DSP resource, wherein the DSP resource processes packets for the communications device to enhance the communication session.

2. The communications system of claim 1, wherein:

the communication session comprises a voice over packet (VoP) session; and the communications device comprises:

a user interface operable to generate audio output based on first packets received from the remote device and to receive audio input from a user;

a processor operable to generate second packets encoding the received audio input and addressed to the remote device; and a network interface operable to transmit the second packets for delivery to the remote device.

3. The communications system of claim 1, wherein the resource manager allocates the DSP resource based on a class of service for the communication session.

4. The communications system of claim 1, wherein:

the communications device communicates a value for the quality parameter as a portion of the request for enhancement of the communication session; and the resource manager allocates the DSP resource based on the value for the quality parameter and available DSP resources in a DSP pool.

5. The communications system of claim 1, wherein the DSP resource is one of a plurality of DSP resources available to process packets for a plurality of communications devices.

6. The communications system of claim 1, wherein the DSP resource is operable to:

receive packets having voice information from the remote device;

process the packets to reduce spurious signals in the voice information; and communicate the processed packets for presentation to a user at the communications device.

7. The communications system of claim 1, wherein the DSP resource is operable to enhance the communication session by compressing and decompressing information to reduce bandwidth requirements for the communication session.

8. A method for enhancing a packet-based communication session comprising:

receiving packets associated with a packet-based communication session from a remote device;

presenting contents of packets to a user;

determining that a quality parameter for the communication session fails to meet a threshold;

based on the determination, requesting enhancement of the communication session from a remote resource manager; and receiving enhanced packets from a digital signal processing (DSP) resource assigned by the resource manager responsive to the request, the enhanced packets generated by the DSP resource by processing information in packets communicated by the remote device.

9. The method of claim 8, wherein the communication session comprises a voice over packet (VoP) session.

10. The method of claim 8, wherein the DSP resource is one of a plurality of DSP resources available to enhance communication sessions for a plurality of communications devices.

11. The method of claim 8, wherein the quality parameter is at least one of packet loss for the communication session, packet delay for the communication session, echo in the communication session, and performance of a jitter buffer for the communication session.

12. The method of claim 8, further comprising communicating the quality parameter to the resource manager, wherein the quality parameter permits the resource manager to allocate DSP resources based on quality parameters received from a plurality of other requesting devices.

13. A resource management apparatus comprising:

an interface operable to receive a request from a first communications device to enhance a packet-based communication session between the first communications device and a second communications device;

a processor operable to allocate a digital signal processing (DSP) resource for the communication session responsive to the request; and the DSP resource operable to receive packets for the communication session from the second communications device, to process the packets to enhance information encoded in the packets, and to communicate the processed packets to the first communications device using the interface.

14. The apparatus of claim 13, wherein the communication session comprises a voice over packet (VoP) session.

15. The apparatus of claim 13, further comprising a plurality of DSP resources available to process packets for a plurality of communication sessions.

16. The apparatus of claim 13, wherein:

the packets from the second communications device comprise voice information; and the DSP resource is further operable to process the packets to reduce spurious signals in the voice information.

17. The apparatus of claim 13, wherein:

the packets from the second communications device comprise compressed information; and the DSP resource is further operable to process the packets from the second communications device to decompress the compressed information.

18. The apparatus of claim 17, wherein the DSP resource is further operable to:

receive packets for the communication session from the first communications device;

compress voice information encoded in the packets from the first communications device;

encode the compressed voice information in compressed packets; and communicate the compressed packets to the second communications device, wherein the compressed packets reduce network bandwidth usage of the communication session.

19. The apparatus of claim 13, wherein the processor is further operable to:

determine a class of service for the first communication session; and allocate the DSP resource for the communication session based on the class of service.

20. The apparatus of claim 13, wherein the processor is further operable to:
   determine that an efficacy of the DSP resource in enhancing the packets fails to meet a threshold; and
   in response to the determination, de-allocating the DSP resource from the communication session.

21. A method for enhancing packet-based communications of a remote device comprising:
   receiving a request from a first communications device to enhance a packet-based communication session between the first communications device and a second communications device;
   allocating a digital signal processing (DSP) resource for the communication session responsive to the request;
   receiving packets for the communication session from the second communications device;
   processing the packets using the allocated DSP resource to enhance information encoded in the packets; and
   communicating the processed packets to the first communications device.

22. The method of claim 21, wherein the communication session comprises a voice over packet (VoP) session.

23. The method of claim 21, wherein:
   the packets from the second communications device comprise voice information; and wherein
   processing the packets using the allocated DSP resource reduces spurious signals in the voice information.

24. The method of claim 21, wherein processing the packets using the allocated DSP resource comprises decompressing compressed information encoded in the packets.

25. The method of claim 24, further comprising:
   receiving packets for the communication session from the first communications device;
   compressing voice information encoded in the packets from the first communications device;
   encoding the compressed voice information in compressed packets; and
   communicating the compressed packets to the second communications device, wherein the compressed packets reduce network bandwidth usage of the communication session.

26. Logic for enhancing packet-based communications of a remote device, the logic encoded in media and operable when executed to:
   receive a request from a first communications device to enhance a packet-based communication session between the first communications device and a second communications device;
   allocate a digital signal processing (DSP) resource for the communication session responsive to the request;
   receive packets for the communication session from the second communications device;
   process the packets using the allocated DSP resource to enhance information encoded in the packets; and
   communicate the processed packets to the first communications device.

27. The logic of claim 26, wherein:
   the packets from the second communications device comprise voice information; and the logic further operable to:
   process the packets using the allocated DSP resource reduces spurious signals in the voice information.

28. The logic of claim 26, further operable to process the packets using the allocated DSP resource to decompressing compressed information encoded in the packets.

29. The logic of claim 28, further operable to:
   receive packets for the communication session from the first communications device;
   compress voice information encoded in the packets from the first communications device;
   encode the compressed voice information in compressed packets; and
   communicate the compressed packets to the second communications device, wherein the compressed packets reduce network bandwidth usage of the communication session.

30. A resource management apparatus comprising:
   means for receiving a request from a first communications device to enhance a packet-based communication session between the first communications device and a second communications device;
   means for allocating a digital signal processing (DSP) resource for the communication session responsive to the request;
   means for receiving packets for the communication session from the second communications device;
   means for processing the packets using the allocated DSP resource to enhance information encoded in the packets; and
   means for communicating the processed packets to the first communications device.

31. The apparatus of claim 30, wherein the means for processing the packets using the allocated DSP resource comprises means for decompressing compressed information encoded in the packets.

32. The apparatus of claim 31, further comprising:
   means for receiving packets for the communication session from the first communications device;
   means for compressing voice information encoded in the packets from the first communications device;
   means for encoding the compressed voice information in compressed packets; and
   means for communicating the compressed packets to the second communications device, wherein the compressed packets reduce network bandwidth usage of the communication session.

* * * * *

UNITED STATES PATENT AND TRADEMARK OFFICE
CERTIFICATE OF CORRECTION

| | | |
|---|---|---|
| PATENT NO. | : 6,856,601 B1 | Page 1 of 1 |
| APPLICATION NO. | : 09/825667 | |
| DATED | : February 15, 2005 | |
| INVENTOR(S) | : Robert T. Bell et al. | |

It is certified that error appears in the above-identified patent and that said Letters Patent is hereby corrected as shown below:

Column 16, Line 41, Claim 31, after "The" delete "apparatus" and insert -- method --.
Column 16, Line 45, Claim 32, after "The" delete "apparatus" and insert -- method --.

Signed and Sealed this

Fifteenth Day of August, 2006

JON W. DUDAS
*Director of the United States Patent and Trademark Office*